United States Patent
Surnilla et al.

(10) Patent No.: US 10,465,620 B2
(45) Date of Patent: Nov. 5, 2019

(54) SYSTEMS AND METHODS FOR LP-EGR DELIVERY IN A VARIABLE DISPLACEMENT ENGINE

(71) Applicant: Ford Global Technologies, LLC, Dearborn, MI (US)

(72) Inventors: Gopichandra Surnilla, West Bloomfield, MI (US); James Alfred Hilditch, Canton, MI (US); Chris Paul Glugla, Macomb, MI (US); Lynn Aimee Chesney, Flat Rock, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 716 days.

(21) Appl. No.: 14/551,939

(22) Filed: Nov. 24, 2014

(65) Prior Publication Data
US 2016/0146136 A1    May 26, 2016

(51) Int. Cl.
*F02D 41/10* (2006.01)
*F02D 41/00* (2006.01)
(Continued)

(52) U.S. Cl.
CPC ......... *F02D 41/0065* (2013.01); *F02D 15/00* (2013.01); *F02D 17/02* (2013.01); *F02D 21/08* (2013.01); *F02D 41/005* (2013.01); *F02D 41/0087* (2013.01); *F02D 41/107* (2013.01); *Y02T 10/47* (2013.01)

(58) Field of Classification Search
CPC ........ F02D 17/00; F02D 17/02; F02D 17/023; F02D 17/026; F02D 41/0087; F02D 41/008; F02D 41/0085; F02D 21/08; F02D 2021/083; F02D 2021/086; F02D 41/0047; F02D 41/005; F02D 41/0052; F02D 41/0055
See application file for complete search history.

(56) References Cited

U.S. PATENT DOCUMENTS 4,274,382 A * 6/1981 Sugasawa ........... F02D 41/0087
                                                  123/198 F
4,398,525 A    8/1983 Ahrns et al.
(Continued)

FOREIGN PATENT DOCUMENTS

EP    0972925 A2    1/2000
WO    2008152483 A1    12/2008

OTHER PUBLICATIONS

Wooldridge, Steven et al., "Method and System for Improved Dilution Tolerance," U.S. Appl. No. 13/975,068, filed Aug. 23, 2013, 57 pages.

*Primary Examiner* — Carl C Staubach
(74) *Attorney, Agent, or Firm* — Geoffrey Brumbaugh; McCoy Russell LLP

(57) ABSTRACT

Methods and systems are provided for controlling LP-EGR flow in a variable displacement engine. In one example, a method may include providing a higher fixed LP-EGR percentage relative to a total intake air flow during a VDE mode, and providing a lower fixed EGR percentage relative to the total intake air flow during a non-VDE mode. Further, during a tip-out when operating in the VDE mode at a load below a threshold, transitioning out of the VDE mode after transitioning the LP-EGR from the higher fixed percentage to the lower fixed percentage.

16 Claims, 7 Drawing Sheets

(51) Int. Cl.
   *F02D 17/02*     (2006.01)
   *F02D 15/00*     (2006.01)
   *F02D 21/08*     (2006.01)

(56) References Cited

U.S. PATENT DOCUMENTS

| | | | |
|---|---|---|---|
| 6,382,193 B1* | 5/2002 | Boyer | F01L 9/04 |
| | | | 123/198 F |
| 7,600,503 B2 | 10/2009 | Russell | |
| 7,934,486 B1* | 5/2011 | Styles | F01N 3/2066 |
| | | | 123/406.23 |
| 8,904,787 B2 | 12/2014 | Styles et al. | |
| 9,677,498 B2* | 6/2017 | Glugla | F02D 43/00 |
| 2005/0022755 A1* | 2/2005 | Hitomi | F01L 1/185 |
| | | | 123/58.8 |
| 2009/0066337 A1* | 3/2009 | Gibson | F01L 1/34 |
| | | | 324/378 |
| 2012/0023937 A1* | 2/2012 | Styles | F02M 26/42 |
| | | | 60/605.2 |
| 2012/0046854 A1 | 2/2012 | Sangkyu et al. | |
| 2012/0285161 A1* | 11/2012 | Kerns | F02D 41/0087 |
| | | | 60/598 |
| 2012/0303247 A1* | 11/2012 | Minami | F02D 41/0052 |
| | | | 701/104 |
| 2014/0305416 A1* | 10/2014 | Gukelberger | F02M 26/43 |
| | | | 123/568.21 |
| 2014/0343827 A1* | 11/2014 | Glugla | F02D 41/0087 |
| | | | 701/108 |
| 2015/0128917 A1* | 5/2015 | Surnilla | F02D 41/12 |
| | | | 123/568.16 |
| 2016/0237928 A1* | 8/2016 | Lana | F02D 13/02 |
| 2017/0175681 A1* | 6/2017 | Sadakane | F02M 25/028 |

* cited by examiner

FIXED MODE EGR SCHEDULING

SYSTEMS AND METHODS FOR LP-EGR DELIVERY IN A VARIABLE DISPLACEMENT ENGINE

FIELD

The present description relates generally to methods and systems for improving LP-EGR delivery in a variable displacement engine.

BACKGROUND/SUMMARY

Exhaust gas recirculation (EGR) systems recirculate a portion of exhaust gas from an engine exhaust to an engine intake system to improve fuel economy and vehicle emissions by reducing throttling losses and combustion temperatures. In turbocharged engines, an EGR system may include a low-pressure EGR (LP-EGR) circuit that diverts exhaust gases from downstream of a turbine of a turbocharger and injects the gases before a compressor. However, the LP-EGR circuit has a long transport delay, as the exhaust gases must travel through the turbocharger compressor, high pressure air induction plumbing, charge air cooler, and intake manifold before reaching the combustion chamber. As a result, it may be difficult to provide a desired amount of EGR to the cylinders, particularly during transient conditions.

One example approach for managing the long transport delay is shown by Styles et al. in US 20120023937. Therein, the LP-EGR system is operated at a fixed EGR percentage rate of fresh air flow across an area of a speed-load map, including a minimum engine load in order to improve transient control of LP-EGR (e.g., during a driver tip-out event when minimum load may be encountered).

However, the inventors herein have recognized issues with the above approach. Specifically, in an engine configured for variable selective cylinder deactivation, when transitioning between operating modes, due to differences in EGR tolerance, engine misfires can occur. As such, the fixed EGR percentage is based on an EGR tolerance level during the minimum engine load. Herein, engine load, or load, will be used to describe the overall engine air flow or engine torque. Cylinder load will be used to describe an average air flow per active cylinder in the engine. In this way, cylinder load will increase at the same engine load when cylinders have been selectively deactivated. However, in engines configured for selective cylinder deactivation (e.g., variable displacement engines (VDE)), the EGR tolerance level of the engine may vary based on whether the engine is operating with all cylinders active or with one or more cylinders deactivated. For example, when operating in a VDE mode with one or more cylinders deactivated, due to an increased cylinder load on the remaining active cylinders, a minimum cylinder load encountered in the VDE mode may be greater than the minimum cylinder load during a non-VDE mode when all the cylinders are active and combusting. Consequently, the engine may tolerate higher EGR levels when operating in the VDE mode than when operating in the non-VDE mode. Therefore, if the fixed EGR percentage is based on engine operation in the VDE mode, the EGR percentage may be greater than required for the non-VDE mode. As a result, there may be excess dilution of intake air in the non-VDE mode which may increase combustion stability issues and the propensity for engine misfires.

Further, during a tip-out occurring when operating in the VDE mode with the fixed EGR percentage based on the VDE minimum load, due to large transport delays associated with the LP-EGR system, the engine operation may transition out of the VDE mode (in order to reduce Noise Vibration and Harshness (NVH) issues, for example) before the EGR is purged from the air induction system. As a result, the engine may be exposed to higher EGR levels than is tolerable by the engine in the non-VDE mode, leading to increased combustion instability and misfires.

In one example, some of the above issues can be at least partly addressed by a method for an engine comprising: in response to a tip-out occurring while operating the engine below a threshold engine load with one or more cylinders deactivated and with LP-EGR provided at a higher fixed schedule relative to intake air flow, delaying reactivation of the deactivated cylinders until EGR has reduced from the higher fixed schedule to a lower fixed schedule relative to intake air flow. In this way, cylinder reactivation may be adjusted based on cylinder EGR tolerance to reduce occurrence of misfire events.

As an example, a VDE engine system may include a LP-EGR system for providing EGR. When operating the VDE engine in a VDE mode with one or more cylinders deactivated and in a speed-load range for fixed EGR percentage, EGR may be provided at a higher fixed EGR percentage due to the higher EGR tolerance of the remaining active cylinders that are operating at a higher average cylinder load. In comparison, when operating in a non-VDE mode with all the cylinders active, EGR may be provided at a lower fixed percentage due to the lower EGR tolerance of engine cylinders operating at a lower average cylinder load. Further, during a tip-out condition occurring when operating in the VDE mode, it may be desirable to transition out of the VDE mode in order to reduce NVH issues or due to hardware constraints, for example. During such tip-out conditions when engine transition from VDE mode to non-VDE mode is desired, if an engine load is below a threshold engine load, transition of engine operation out of the VDE mode may be delayed until the EGR percentage relative to intake air flow decreases to the lower fixed percentage. This avoids the condition where the engine is operating with a higher EGR schedule than the engine can tolerate. However, if the engine is operating in the VDE mode at an engine load above the threshold load, the engine may be allowed to transition out of the VDE mode while transitioning EGR from the higher fixed percentage to the lower fixed percentage.

In this way, by providing EGR in two different fixed schedules including the higher fixed percentage of EGR during the VDE mode and the lower fixed percentage of EGR during the non-VDE mode, during each mode, the engine may be operated with an EGR schedule that the engine can tolerate, while allowing the EGR schedule to be varied based on the different EGR tolerances in the different modes. By allowing a higher flat EGR schedule to be applied when selected cylinders are deactivated, the EGR percentage in the air induction system can be raised, increasing the effectiveness of EGR. By allowing a lower flat EGR schedule to be applied during the non-VDE mode, excess intake air dilution with EGR may be reduced, reducing slow burn issues. Further, by delaying engine transition out of the VDE mode responsive to a tip-out until the EGR level corresponding to the VDE mode is cleared out of the air induction system, engine misfires and slow combustion issues due to engine exposure to higher than tolerable EGR levels is reduced. Consequently, engine misfire events are reduced and combustion stability may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates to an EGR system coupled to a turbocharged variable displacement engine in a motor vehicle. In one non-limiting example, the VDE engine may be configured as part of the engine system illustrated at FIG. 1, wherein the engine includes at least one cylinder, a control system, a turbocharger, and an exhaust gas recirculation system, among other features. The engine may also be configured with a plurality of cylinder banks as illustrated at FIG. 2. An engine controller may be configured to perform a control routine, such as the example routines of FIGS. 3-4 to adjust the LP-EGR schedule based on minimum cylinder load requirements of the engine as the engine transitions between operating with all cylinders active (non-VDE mode) and operating with one or more deactivated cylinders (VDE mode). The various EGR schedules may be selected based on engine-speed load maps, such as the speed-load maps of FIGS. 5A and 5B. An example EGR schedule adjustment is illustrated with reference to FIG. 6.

Figure 1:
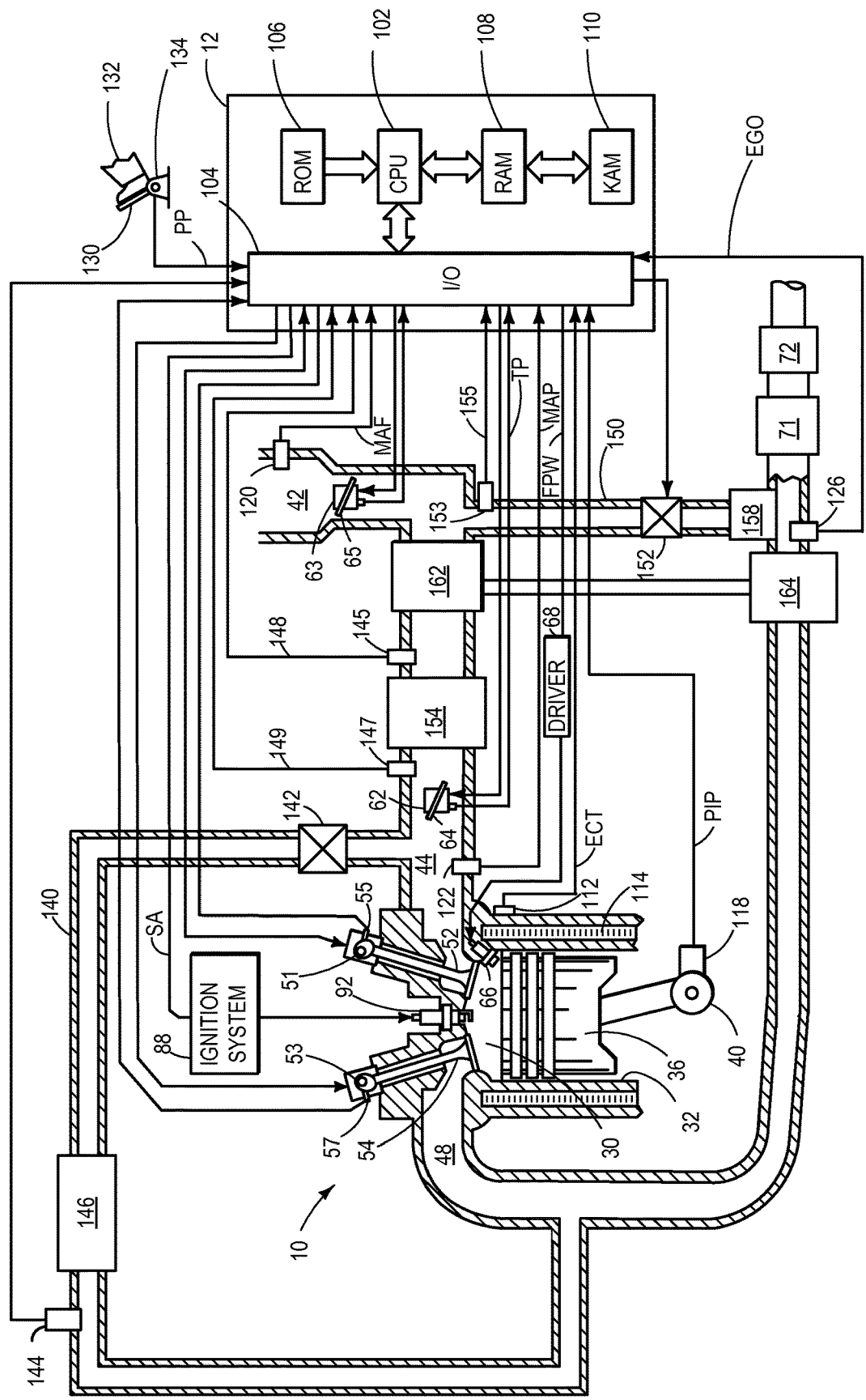
FIG. 1 shows a partial engine view.
Figure 2:
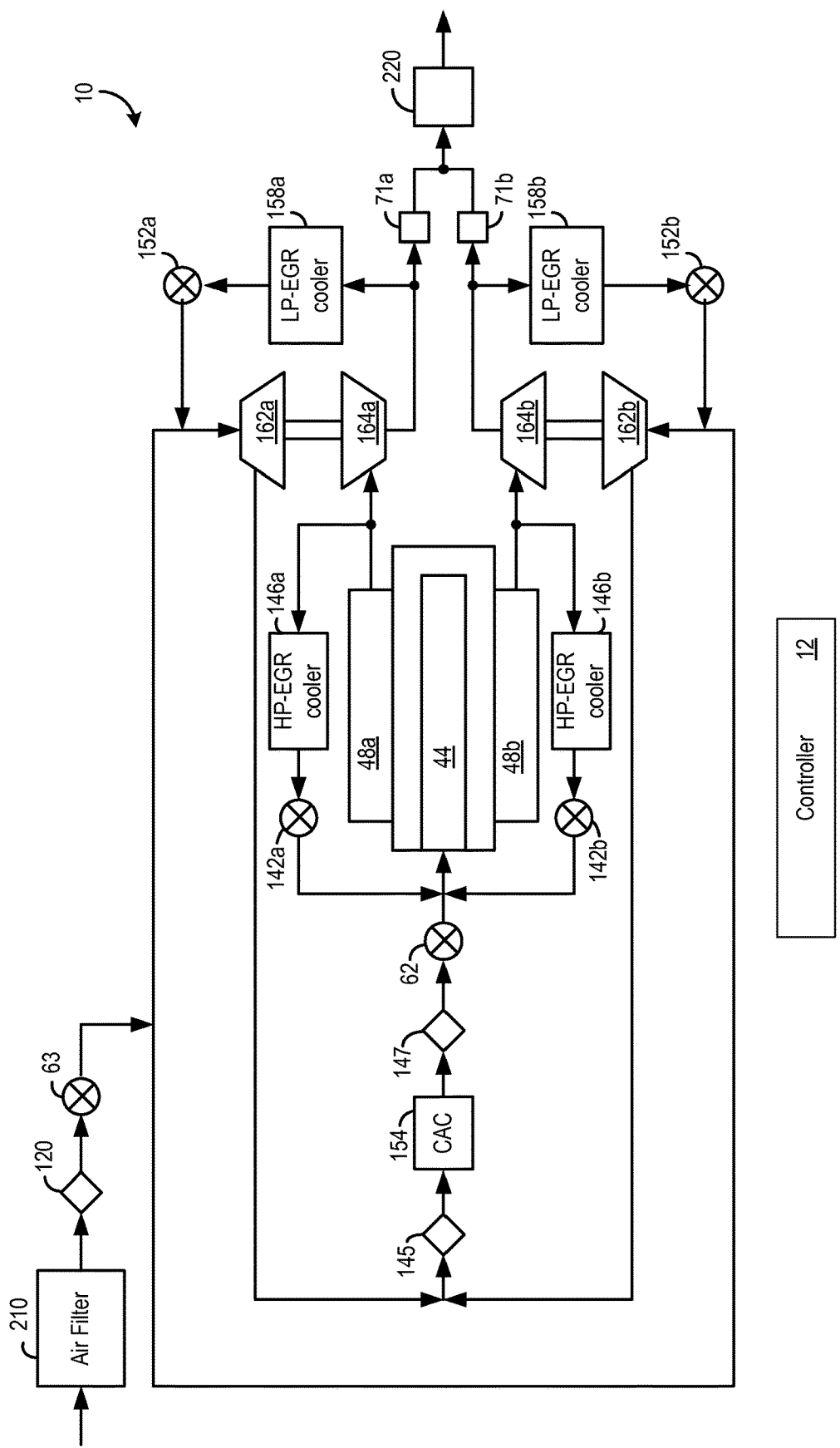
FIG. 2 shows a schematic diagram of an engine system with dual cylinder banks, the engine including an exhaust gas recirculation system.

Referring now to FIG. 1, it shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, and temperature of the exhaust gas. For example, an HP-EGR sensor 144 may be arranged within HP-EGR passage 140.

In some embodiments, one or more sensors may be positioned within LP-EGR passage 150 to provide an indication of one or more of a mass flow, pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_X$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc. In FIG. 2, an example of an engine system including a plurality of cylinder banks and an exhaust gas recirculation system is illustrated. In one embodiment, engine 10 may comprise a turbocharger including compressor 162 and turbine 164, throttle 63 upstream of compressor 162, and a low-pressure exhaust gas recirculation (LP-EGR) system. The LP-EGR system may route EGR from downstream of turbine 164 to upstream of compressor 162 and downstream of throttle 63. The engine system may further comprise a HP-EGR system which routes EGR from upstream of turbine 164 to downstream of throttle 62.

Turning to FIG. 2, air may enter engine 10 through an air filter 210. Air filter 210 may be configured to remove solid particulates from the air so a clean air mass may enter engine 10. The clean air mass flow may be measured as it flows past mass air flow sensor 120 and then through intake throttle 63. The clean air mass flow measured by mass air flow sensor 120 may be communicated to controller 12. In one embodiment, the clean air mass may be split between the different cylinder banks of engine 10 downstream of intake throttle 63 and upstream of turbocharger compressor 162. An EGR system may inject exhaust gas upstream of turbocharger compressor 162 so that a combination of clean air and exhaust gas can be compressed by turbocharger compressor 162. In one embodiment, turbocharger compressor 162 may include a first compressor 162a for a first cylinder bank and a second compressor 162b for a second cylinder bank.

In one example, engine 10 may be a V8 engine with the first and second banks each having four cylinders. As one non-limiting example, engine 10 can be included as part of a propulsion system for a passenger vehicle.

Engine 10 may have cylinders (depicted in FIG. (1) with selectively deactivatable intake valves and selectively deactivatable exhaust valves. In one example, the intake valves and exhaust valves may be configured for electric valve actuation (EVA) via electric individual cylinder valve actuators. While the example of FIG. 1 shows each cylinder having a single intake valve and a single exhaust valve, in alternate examples, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on only the first bank, one or more cylinders on only the second bank, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder. In addition, fuel flow and spark to the deactivated cylinders may be stopped, such as by deactivating cylinder fuel injectors.

In some examples, engine 10 may have selectively deactivatable (direct) fuel injectors and the selected cylinders may be deactivated by shutting off the respective fuel injectors while maintaining operation of the intake and exhaust valves such that air may continue to be pumped through the cylinders.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. As a result, the remaining active cylinders operate with a higher average cylinder load. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Cylinders may also be deactivated to provide a specific firing pattern based on a designated control algorithm. More specifically, selected "skipped" working cycles may not be fired while other "active" working cycles are fired. Optionally, a spark timing associated with a selected firing of a selected working chamber may also be adjusted based on a firing order or firing history of the selected working chamber. The engine controller 12 may be configured with suitable logic for determining a cylinder deactivation (or skip-firing) pattern based on engine operating conditions.

The compressed combination of clean air and exhaust gas downstream of turbocharger compressor 162 may be cooled by a charge air cooler (CAC) 154 upstream of a second throttle 62. In one embodiment, the oxygen content of the airflow downstream from turbocharger compressor 162 may be measured by a sensor 145 upstream of CAC 154. In an alternate embodiment, the oxygen content of the airflow downstream from turbocharger compressor 162 may be measured by a sensor 147 downstream of CAC 154. Measurements from sensors 145 and/or 147 may be communicated to controller 12.

In one embodiment, high pressure exhaust gas may be combined with the compressed combination of clean air and exhaust gas downstream of throttle 62 and upstream of intake manifold 44. The combination of gases may be routed to one or more cylinder banks by intake manifold 44. After combustion in the cylinders, exhaust gas may be routed through exhaust passage 48. In one embodiment, exhaust passage 48 includes an exhaust manifold for each bank of cylinders, such as exhaust manifold 48a for a first cylinder bank and exhaust manifold 48b for a second cylinder bank.

At least a portion of the exhaust gasses may drive a turbine 164 of the turbocharger. In one embodiment, turbine 164 may include a first turbine 164a for a first cylinder bank and a second turbine 164b for a second cylinder bank. In one embodiment, at least a portion of the exhaust gasses may be routed through an HP-EGR system. For example, an HP-EGR system may include HP-EGR cooler 146 and valve 142 for routing cooled exhaust gasses upstream of intake manifold 44. In one embodiment, a HP-EGR system may include a first HP-EGR cooler 146a and valve 142a for a first cylinder bank and a second HP-EGR cooler 146b and valve 142b for a second cylinder bank.

Downstream from turbine 164, at least a portion of the exhaust gasses may flow downstream through emission control device 71 and muffler 220. In one embodiment, emission control device 71 may include a first light-off catalyst 71a for a first cylinder bank and a second light-off catalyst 71b for a second cylinder bank. Muffler 220 may be configured to dampen exhaust noise from engine 10.

At least a portion of the exhaust gasses from downstream of turbine 164 may be routed upstream of turbocharger compressor 162 by an LP-EGR system. For example, an LP-EGR system may include LP-EGR cooler 158 and valve 152 for routing cooled exhaust gasses upstream of compressor 162. In one embodiment, an LP-EGR system may include a first LP-EGR cooler 158a and valve 152a for a first cylinder bank and a second LP-EGR cooler 158b and valve 152b for a second cylinder bank.

Thus, engine 10 may comprise both an HP-EGR and an LP-EGR system to route exhaust gases back to the intake. In some embodiments, the LP-EGR system may be controlled to operate under various schedules as elaborated further with respect to FIGS. 3-6 based on engine operating parameters.

In one example, the LP-EGR system may be controlled to provide a fixed percentage of LP-EGR with respect to a total intake air flow when operating in a fixed schedule speed-load range. For example, even as the speed and engine load conditions vary, as long as the operating conditions fall within the fixed schedule speed-load range, the percentage of LP-EGR with respect to intake air may remain fixed. Further, when operating in the fixed range, if the engine is in a VDE mode, a higher fixed percentage of LP-EGR may be provided due to the higher minimum cylinder load and higher EGR tolerance of active cylinders when the engine is operating with one or more cylinders deactivated, while a lower fixed percentage of LP-EGR may be provided due to the lower minimum cylinder load and lower EGR tolerance of cylinders when the engine is operating with all cylinders active.

In this way, by utilizing the higher LP-EGR percentage for the VDE mode and the lower LP-EGR percentage for the non-VDE, the technical effect of delivering EGR that better matches the cylinder's EGR tolerance is provided. In addition, excess intake air dilution with EGR is reduced, improving combustion stability.

Further, while the engine is operating in the VDE mode with a higher flat LP-EGR schedule, in response to a torque transient (such as a tip-out, for example) occurring at an engine load below a threshold engine load, and in response to leave the VDE mode (in order to reduce NVH issues during the tip-out, for example), the higher EGR percentage may be reduced to the lower EGR percentage before transitioning the engine out of the VDE mode. As such, there may be delays in purging LP-EGR from the air induction system due to associated transport delays. Consequently, if EGR is not purged to lower levels before reactivating engine cylinders, the cylinders may be exposed to a higher EGR level than they can tolerate. As a result, combustion stability may be improved and a tendency for engine misfires and slow burns may be reduced. Details of LP-EGR scheduling during different modes of engine operation will be further elaborated with respect to FIGS. 3-6.

Figure 3:
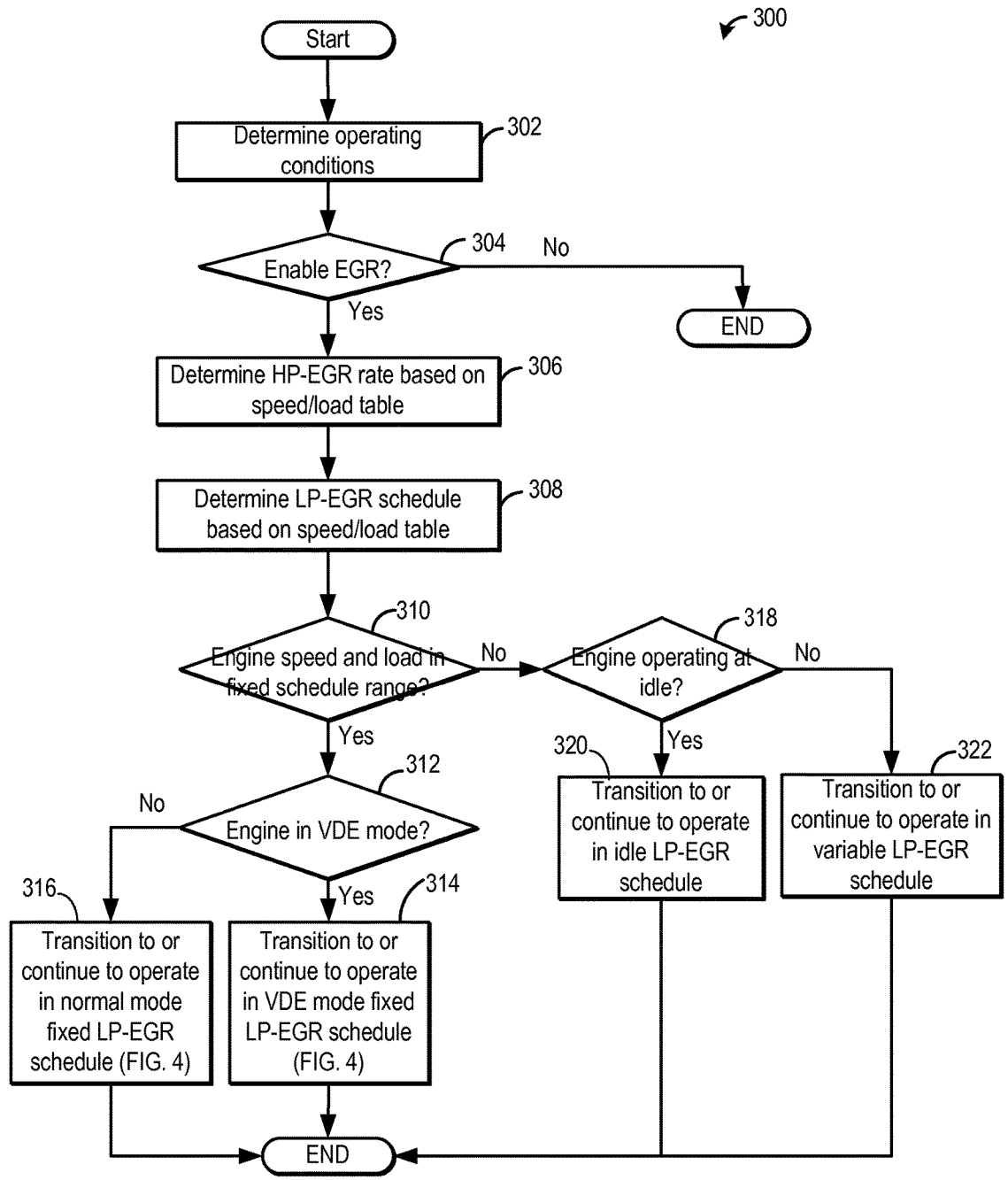
FIG. 3 shows a high level flow chart of an example method for determining an LP-EGR schedule.

FIG. 3 is a flow chart illustrating a method 300 for determining an LP-EGR schedule based on engine operating conditions. The method of FIG. 3 may be stored as executable instructions in non-transitory memory of controller 12 shown in FIGS. 1-2 and carried out by the controller in combination with the various sensors, actuators, and engine components illustrated in FIGS. 1-2.

Method 300 may include, at 302, determining engine operating conditions. Engine operating conditions such as engine speed, engine load, vehicle speed, engine temperature, etc., may be measured and/or estimated from sensors including throttle position sensor, pedal position sensor, etc. Method 300 may then determine whether EGR is to be enabled at 304, based on the engine operating parameters determined at 302. EGR may be enabled at low engine speed-load conditions. EGR may be disabled when engine temperature is below a threshold, for example, or when the engine has been at idle for an extended period of time.

Figure 5A:
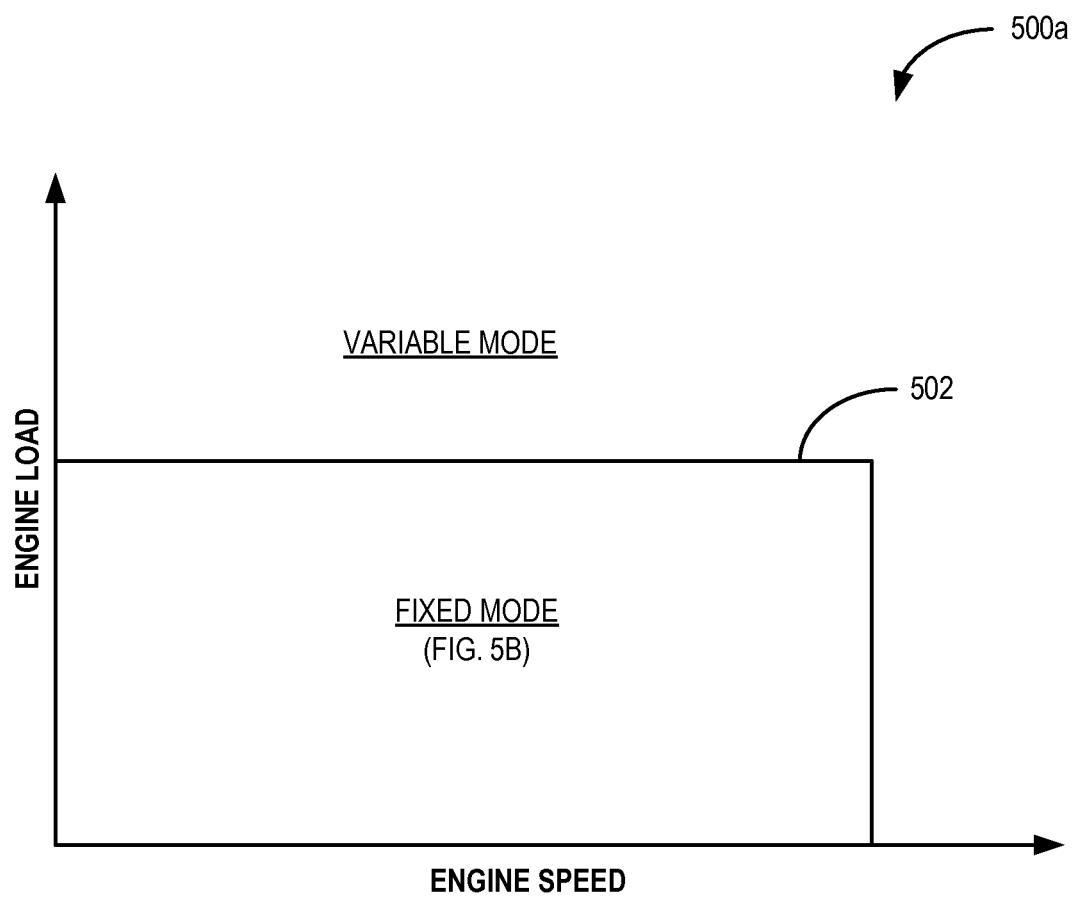
FIG. 5A shows an example speed-load map for a variable LP-EGR schedule and a fixed LP-EGR schedule.

If it is determined that EGR is not be enabled, method 300 returns. If it is determined that EGR is to be enabled, method 300 proceeds to 306 to determine an HP-EGR schedule (including an HP-EGR rate, percentage, amount, temperature, etc.) based on engine speed and load conditions. The amount of HP-EGR delivered to the intake may be based on an engine-speed load map stored in the memory of controller 12. Method 300 may then proceed to 308 to determine an LP-EGR schedule (including an LP-EGR rate, percentage, amount, temperature, etc.) based on the operating conditions determined at 302. In some embodiments, the LP-EGR schedule may be determined based on a speed-load table stored in the memory of controller 12. In addition, the LP-EGR schedule may be adjusted based on the determined HP-EGR schedule to provide an overall engine dilution. One example of an engine speed-load map depicting two LP-EGR operating schedules, fixed and variable, is shown at FIG. 5A.

At 310, it may be determined whether engine speed and engine load are in the fixed schedule range. In one embodiment, the fixed schedule range comprises all engine loads from mid load down to minimum engine load, and/or engine speeds lower than a threshold, such as 3500 RPM. Minimum engine load as described herein comprises the lowest possible engine load allowable for current operating conditions, e.g. the lowest engine load that sustains combustion for current engine speed, temperature, etc., and may correspond to a closed throttle engine load for current engine speed conditions. In some conditions, the minimum engine load may be lower than the engine load at idle. Thus, the minimum engine load may be encountered during non-idle conditions and may include the smallest air charge possible for avoiding engine misfire.

Upon confirming that the engine is operating in the fixed mode range, method 300 may proceed to 312 to determine if the engine is operating in a VDE mode. For example, determining engine operation in the VDE mode may include determining that the engine is operating with one or more cylinders of a given engine bank deactivated while engine cylinders of a remaining engine bank are active. In one example, the engine may be operated in the VDE mode responsive to driver torque demand being lower than a threshold demand. Upon confirming that the engine is operating in the VDE mode with one or more cylinders deactivated, method 300 may proceed to 314. At 314 the method may include transitioning to, or continuing to operate in, a VDE mode fixed LP-EGR schedule. In one example, operating the engine in a VDE mode fixed LP-EGR schedule may include delivering LP-EGR at a higher fixed percentage (relative to intake air). The higher fixed percentage may be based on a minimum engine load that the engine may operate at when in the VDE mode. In addition, the higher fixed percentage may be based on a higher average cylinder load of active firing cylinders when the engine is in the VDE mode. Details of engine operation in the VDE mode fixed LP-EGR schedule are elaborated with reference to FIG. 4.

If the engine is not operating in the VDE mode (that is, if all cylinders are active), method 300 may proceed to 316 to transition to, or to continue to operate with a normal mode fixed LP-EGR schedule. In one example, operating engine in a normal mode fixed LP-EGR schedule may include delivering LP-EGR at a lower fixed percentage. The lower fixed percentage may be based on a minimum cylinder load that the engine may operate in the non-VDE mode. In addition, the lower fixed percentage may be based on a lower average cylinder load of firing cylinders when the engine is in the non-VDE mode. As such, the minimum cylinder load that the engine encounters during the VDE mode may be greater than the minimum cylinder load during the non-VDE mode due to fewer active cylinders combusting to meet the torque demand. Consequently, the EGR percentage provided during the VDE mode (that is, the higher EGR percentage) may be greater than the EGR percentage provided during the non-VDE mode (that is, the lower EGR percentage). Details of engine operation in the normal mode fixed LP-EGR schedule will be further elaborated with reference to FIG. 4. In some examples, the normal mode fixed EGR schedule may be utilized during conditions when enablement of VDE is not possible, such as when driver torque demand is higher than a threshold demand or an engine oil temperature is lower than a threshold temperature.

It will be appreciated that while the minimum cylinder load is utilized in the given example, in alternate examples, air load per engine combustion may be utilized. For example, the higher fixed percentage EGR (with respect to intake air flow) may be based on a minimum air load during VDE mode, and the lower fixed percentage EGR (with respect to intake air flow) may be based on a minimum air load during non-VDE mode.

Returning to 310, if the engine is not operating with speed and load in the fixed range, method 300 may proceed to 314 to determine if the engine is operating at idle. Idle conditions may include engine speed, load, and vehicle speed being below a threshold, as well as brake pedal position past a threshold, transmission in park, etc. If it is determined that the engine is operating at idle, method 300 may proceed to 316 to transition to, or continue operating in, an idle LP-EGR schedule. Operating in the idle LP-EGR schedule may include, in one example, delivering an idle EGR percentage rate of fresh airflow, the idle rate being lower than the EGR percentage maintained during each of the normal mode fixed LP-EGR schedule and the VDE mode fixed LP-EGR schedule. In another example, operating in the idle LP-EGR schedule may include blocking airflow through the LP-EGR system, and thus the LP-EGR valve may be closed while in the idle mode. Operating in the idle LP-EGR schedule may also include adjusting a throttle and adjusting a spark timing. For example, throttle opening may be reduced and spark timing may be advanced during the idle mode.

If the engine is not operating at idle, method 300 may proceed to 318 to transition to, or continue to operate in, a variable LP-EGR schedule. The variable LP-EGR schedule may be enabled at engine speed and engine loads outside the fixed schedule range, and in some examples may comprise all engine loads above mid-load (e.g., above 50% engine load) and all engine speeds above a threshold, such as above 3500 RPM. Enabling the variable EGR mode includes ramping the LP-EGR valve open and adjusting the valve so that the desired EGR percentage rate of fresh airflow is maintained. The LP-EGR valve may be adjusted to deliver an amount of LP-EGR such that the EGR percentage rate of fresh airflow in the intake passage is varied based on engine speed and engine load changes. Enabling the variable LP-EGR schedule may also include adjusting the throttle and adjusting the spark timing.

Thus, method 300 provides for determining the desired amount of HP-EGR to deliver to the intake based on engine speed and load, and further provides for determining which LP-EGR schedule to operate in. The lower fixed schedule may optimize delivery of LP-EGR during engine operation in a non-VDE mode by maintaining a lower fixed EGR percentage rate of fresh airflow, that is, maintain lower fixed EGR percentage of fresh airflow within the total airflow, which includes the EGR and fresh airflow. The higher fixed schedule may optimize delivery of EGR in a VDE mode by maintaining a higher fixed percentage of fresh air flow. By delivering fixed EGR percentage in two schedules based on the mode of engine operation, effectiveness of LP-EGR during different modes of engine operation may be improved.

In some embodiments, the control of the LP-EGR system is maintained independently of the HP-EGR system. Thus, under certain operating conditions, the HP-EGR rate may be varied as speed and/or load change, while the LP-EGR percentage is fixed, even as load changes. Under other conditions, such as during a transition from the fixed to variable mode, the HP-EGR rate may be adjusted in response to the transition.

Figure 4:
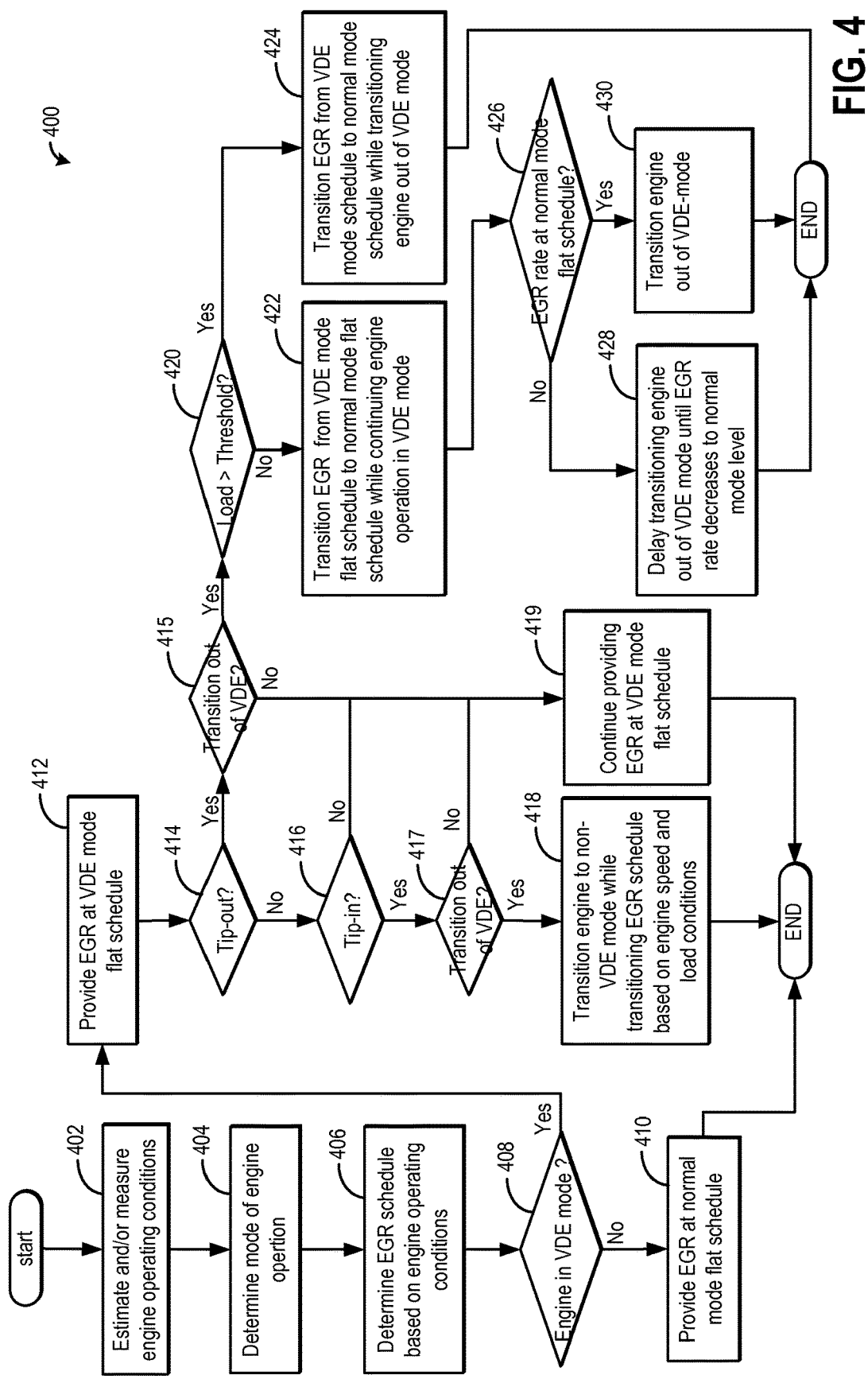
FIG. 4 shows a high level flow chart depicting an example method for adjusting a fixed mode LP-EGR schedule during engine operation based on individual cylinder deactivation.

Turning to FIG. 4, a method 400 for adjusting an LP-EGR schedule during engine operation in a speed-load area for a fixed LP-EGR schedule is shown. As discussed at FIG. 3, a fixed rate LP-EGR schedule may be utilized during engine operating conditions at engine loads from mid-load down to minimum engine load, and/or engine speeds lower than a threshold, such as 3500 RPM. Further, when operating in the fixed schedule range, a VDE mode LP-EGR fixed schedule may be utilized during a VDE mode, while a normal mode LP-EGR fixed schedule may be utilized during a non-VDE mode. In the examples illustrated herein, the VDE mode LP-EGR schedule may also be referred to as a higher fixed schedule, and the normal mode LP-EGR fixed schedule may also be referred to as a lower fixed schedule. The method of FIG. 4 may be stored as executable instructions in non-transitory memory of controller 12 shown in FIGS. 1-2 and carried out by the controller in combination with the various sensor, actuators, and engine components illustrated in FIGS. 1-2.

Method 400 may include, at 402, determining engine operating conditions. Engine operating conditions may include engine speed, engine load, vehicle speed, engine temperature, exhaust catalyst temperature, manifold pressure (MAP), manifold air flow (MAF), barometric pressure etc., measured and/or estimated from sensors including throttle position sensor, pedal position sensor, etc. As such, in the given example, the engine may be operating at speed and load conditions in the fixed schedule range for LP-EGR, wherein the fixed schedule range includes all engine loads from mid load down to minimum engine load, and/or engine speeds lower than a threshold, such as 3500 RPM.

At 404, based on the estimated operating conditions, method 400 may include determining an engine mode of operation (e.g., VDE, or non-VDE). For example, if the torque demand is low, the engine may be operating in a VDE mode with one or more cylinders deactivated while the torque demand is met by the remaining active cylinders. In comparison, if the torque demand is high, the engine may be operating in a non-VDE mode with all the cylinders active.

At 406, the LP-EGR schedule may be determined based on the estimated operating conditions and the mode of engine operation (VDE or non-VDE). As discussed above, in the given example, the engine may be operating at speed and load conditions in the fixed mode range for LP-EGR. During the VDE mode of operation when one or more cylinders deactivated, operating EGR in the fixed schedule may include providing LP-EGR at the higher fixed schedule; and during non-VDE mode of engine operation when all cylinders are active and combusting, operating EGR in the fixed schedule may include providing LP-EGR at the lower fixed schedule. In one example, the higher fixed schedule may be based on a first minimum cylinder load in the VDE mode, and the lower fixed schedule may be based on a second minimum cylinder load in the non-VDE mode, wherein the first minimum cylinder load in the VDE mode is greater than the first minimum cylinder load in the non-VDE mode. In another example, the higher fixed schedule may include providing EGR at 20% with respect to intake air flow, and the lower fixed schedule may include providing EGR at 15% with respect to intake air flow.

Next, at 408, method 400 may include confirming if the engine is operating in a VDE mode. In one example, the VDE mode may be confirmed when one or more cylinders are deactivated. The one or more cylinders may be deactivated in response to a torque demand less than a threshold demand, for example. Upon confirming engine operation in the VDE mode, method 400 may proceed to 412.

At 412, method 400 may include providing EGR at the higher fixed schedule which includes providing LP-EGR at a higher fixed percentage. Providing LP-EGR at the higher fixed percentage may include adjusting the valve so that a fixed EGR percentage rate of fresh airflow is maintained. The airflow may be measured in the intake passage downstream of a point where LP-EGR and fresh air mix and upstream of a charge air cooler, such as CAC 154. The percentage EGR of fresh airflow may be determined by an oxygen sensor, such as sensor 145. The LP-EGR valve may be adjusted to deliver an amount of LP-EGR such that the EGR percentage of fresh airflow in the intake passage is maintained at the higher fixed percentage rate, regardless of engine speed and load changes, while the engine is operating in the fixed schedule range and in the VDE mode. In some examples, the higher fixed EGR percentage rate of fresh airflow may be a total airflow wherein 80% of the airflow comprises fresh air while 20% comprises EGR. Any suitable fresh airflow percentage that maintains fuel economy, emissions, combustion stability, and power output at desired levels during the VDE mode may be used.

Returning to 408, if engine operation in the VDE mode is not confirmed, method 400 may proceed to 410. For example, if the engine is not operating in the VDE mode, the engine may be operating in a non-VDE mode. Accordingly, at 410, method 400 may include providing EGR at a normal mode flat schedule. For example, when engine is operating in the non-VDE mode, the EGR tolerance level for the engine may be lower. Consequently, EGR may be provided at a second lower fixed schedule which may be lower than the higher fixed schedule. Providing LP-EGR at the lower fixed percentage may include adjusting the LP-EGR valve to deliver LP-EGR such that the EGR percentage of fresh airflow in the intake passage is maintained at the lower fixed percentage rate, regardless of engine speed and load changes, while the engine is operating in the fixed schedule range and in the VDE mode. In one example, during non-VDE mode of engine operation, LP-EGR may be provided at 15% with respect to intake air flow.

Returning to 412, upon providing LP-EGR at the higher VDE mode fixed schedule, method 400 may proceed to 414. At 414, method 400 may include confirming if a tip-out event has occurred. For example, confirming a tip-out event may include determining if the operator has released the accelerator pedal. In one example, in response to the tip-out operation, torque demand may drop from a higher torque demand to a lower torque demand below the threshold demand. In another example, in response to the tip-out operation, the torque demand may drop from the higher torque demand to a minimum torque demand. If it is determined that a tip-out operation has occurred, method 400 may proceed to 415.

At 415, upon determining the tip-out operation, method 400 may include determining if the engine may be transitioned out of the VDE mode to the non-VDE mode (in order to reduce NVH issues, for example). If the answer is NO, method 400 may proceed to 419. If the answer at 415 is YES, method 400 may proceed to 420.

At 419, upon confirming that engine transition out of the VDE mode is not required, method 400 may include continuing providing EGR at the VDE mode flat schedule which includes providing LP-EGR at a higher fixed percentage with respect to intake air flow.

At 420, upon confirming engine transition out of the VDE mode (in response to the tip-out operation), method 400 may include determining if a current engine load is greater than a threshold engine load. If the current load is not greater than the threshold load, method 400 may proceed to 422 to change EGR schedule from the higher fixed schedule (that is, VDE mode fixed LP-EGR schedule) to the lower fixed schedule (that is, normal mode fixed LP-EGR schedule) while continuing engine operation in the VDE mode. For example, in response to the tip-out operation, such as, tip-out to idle conditions or lower engine load conditions, the engine operation may transition out of VDE in order to reduce NVH issues. Since an EGR tolerance level of the engine is based on cylinder load, during the tip-out, as the engine load changes from higher load to lower load, the EGR tolerance level of the engine may gradually decrease. Due to large air induction volume between the compressor and the intake manifold of the LP-EGR system, during tip-out conditions when the engine load is lower than the threshold load, if the engine is transitioned out of the VDE mode (e.g. to idle or to lower load) before the LP-EGR is fully purged from the intake manifold, the engine may operate with higher EGR than tolerable upon transitioning out of VDE. As a result, engine misfires may occur. Therefore, in response to a tip-out event, when the engine is operating in the VDE mode with engine load less than the threshold engine load, the EGR schedule may be transitioned from the higher fixed schedule to lower fixed schedule while continuing to operate the engine in the VDE mode. The engine may then be transitioned out of the VDE mode only after the EGR rate has decreased from the higher fixed percentage to the lower fixed percentage, that is, to an EGR level that the active cylinders can tolerate. As an example, EGR schedule may be transitioned from a 20% fixed EGR rate (VDE schedule) with respect to intake air flow to a 15% fixed EGR rate (normal schedule) with respect to intake air flow while continuing operation in the VDE mode, and then when the EGR rate has been purged to 15%, the deactivated cylinders may be reactivated and the engine may be transitioned out of the VDE mode. Decreasing EGR schedule from the higher fixed percentage to the lower fixed percentage may include adjusting the EGR valve (decreasing an opening of the EGR valve) to deliver the lower fixed percentage.

In one example, when operating in a VDE mode, during tip-out conditions (such as tip-out conditions triggering engine transition out of VDE) to an engine load below a threshold engine load, engine transition out of VDE may be delayed until the EGR percentage of intake air flow is reduced from a first higher percentage to a second lower percentage, the lower percentage utilized during engine operation in the non-VDE mode. In comparison, when operating in the VDE mode, during tip-out conditions (such as tip-out conditions triggering engine transition out of VDE) to an engine load above the threshold engine load, engine transition out of VDE may be performed while (that is, concurrent to) the EGR percentage of intake air flow is reduced from a first higher percentage to a second lower percentage, the lower percentage utilized during engine operation in the non-VDE mode.

In another example, when operating in the VDE mode, in response to a tip-out occurring at a first load below a threshold to a second load below the threshold, engine transition out of VDE may be delayed until the EGR percentage of intake air flow is reduced from a first higher percentage to a second lower percentage, the lower percentage utilized during engine operation in the non-VDE mode. In comparison, in response to a tip-out occurring at a first load above the threshold load to a second load below the threshold load, engine transition out of VDE may be performed while the EGR percentage of intake air flow is reduced from a first higher percentage to a second lower percentage, the lower percentage utilized during engine operation in the non-VDE mode Next at 426, method 400 may include determining if the LP-EGR percentage has reached the lower fixed schedule percentage. In one example, it may be determined if the EGR scheduling has decreased from 20% LP-EGR to 15% LP-EGR. If the EGR percentage of intake air flow has reached the lower fixed schedule percentage, method 400 may proceed to 430 to transition the engine out of the VDE mode. For example, in response to the tip-out operation when operating in VDE, upon determining that the LP-EGR has purged to normal mode EGR levels (that is, lower fixed percentage), the engine may begin to transition out of the VDE mode. Transitioning out of the VDE mode includes reactivating the deactivated cylinders by resuming fuel, valve, and spark operation so that all the cylinders are active and combusting. If the EGR percentage has not reached the normal mode fixed schedule percentage, method 400 may proceed to 428 to delay transitioning the engine out of the VDE mode until the EGR percentage decreases to the normal mode EGR level.

Returning to 420, in response to the tip-out operation, if it is determined that the current engine load is greater than the threshold, method 400 may proceed to 424 to transition EGR from the higher VDE mode fixed LP-EGR schedule to the lower normal mode fixed LP-EGR schedule while transitioning engine operation out of VDE mode. In other words, transition of engine operation out of VDE mode may not be delayed if during the tip-out the engine is operating at an engine load greater than the threshold. For example, during the tip-out, since the current load is greater than the threshold load, the engine may be able to tolerate higher EGR levels. Therefore, the transition of engine operation out of VDE mode and transition of EGR schedule from the VDE mode fixed LP-EGR schedule to the normal mode fixed LP-EGR schedule may occur simultaneously. That is, transition of engine operation out of VDE mode may not be delayed until EGR is purged to normal mode level.

In this way, during engine operation in the VDE mode, in response to the tip-out operation occurring when the current load is greater than threshold, EGR schedule may be transitioned from the higher fixed VDE mode schedule to the lower fixed VDE mode schedule while transitioning the engine out of the VDE mode. However, if the tip-out occurs when the current engine load is less than the threshold load, EGR schedule may be transitioned from the higher fixed VDE mode schedule to the lower fixed normal mode schedule, and the engine operation may be transitioned out of the VDE mode only when the EGR level reached the normal mode fixed schedule rate. By delaying transition of engine operation from the VDE mode during tip-out when the current load is less than the threshold load, EGR tolerance of the engine during transient conditions may be improved, and consequently, engine misfires may be reduced.

Returning to 414, if the tip-out condition is not confirmed, method 400 may proceed to 416 to confirm if a tip-in to a higher engine load is detected. The higher load may be greater than a higher engine load threshold. If a tip-in is confirmed, method 400 may proceed to 417 to confirm if the engine may be transitioned out of the VDE mode. If yes, method 400 may proceed to 418 to transition engine operation out of VDE mode while transitioning EGR schedule based on engine speed and engine load conditions. If the answer at 417 is NO, method 400 may proceed to 419 to continue providing EGR at VDE mode flat schedule which includes providing LP-EGR at the higher fixed percentage with respect to intake air flow as discussed above.

In one example, during the tip-in, the engine speed and engine load may increase such that the engine may be operating outside the speed and load range for fixed mode EGR schedule, and in some embodiments may include all engine speeds above a threshold, such as 3500 RPMs, and all engine loads above mid-load (e.g., above 50% load). Consequently, in response to the tip-in, EGR may be transitioned from the fixed schedule to a variable schedule. Transitioning to the variable schedule from the fixed schedule may include adjusting the LP-EGR valve to deliver a desired EGR percentage rate of fresh airflow such that the EGR percentage rate of fresh airflow in the intake passage is varied based on engine speed and load changes. For example, transitioning to the variable mode may include adjusting the valve to increase the LP-EGR rate. The transition may also include opening the throttle and advancing spark timing.

In another example, during the tip-in, the engine speed and load may increase. However, the engine may continue to operate in the speed and load range for fixed LP-EGR schedule. Consequently, in response to the tip-in, EGR may be transitioned from the higher fixed schedule (VDE) to the lower fixed mode normal schedule (non-VDE). As such, during tip-in to higher engine load, EGR tolerance may be higher, and therefore, EGR may transition to the normal mode fixed schedule from the VDE mode fixed schedule while transitioning engine operation out of the VDE mode. For example, in response to the tip-in, EGR may be transitioned from 20% to 15% while transitioning engine out of the VDE mode.

In some examples, in response to the tip-in to higher engine load, engine operation may transition out of the VDE mode only when an expected engine load in the normal (non-VDE) mode is greater than a threshold VDE engine load. For example, the threshold VDE engine load may be a minimum engine load in the VDE mode.

In this way, during tip-in conditions, LP-EGR may be provided based on engine speed-load conditions and the mode of engine operation to ensure optimal amount of EGR during transient engine operations.

Figure 5B:
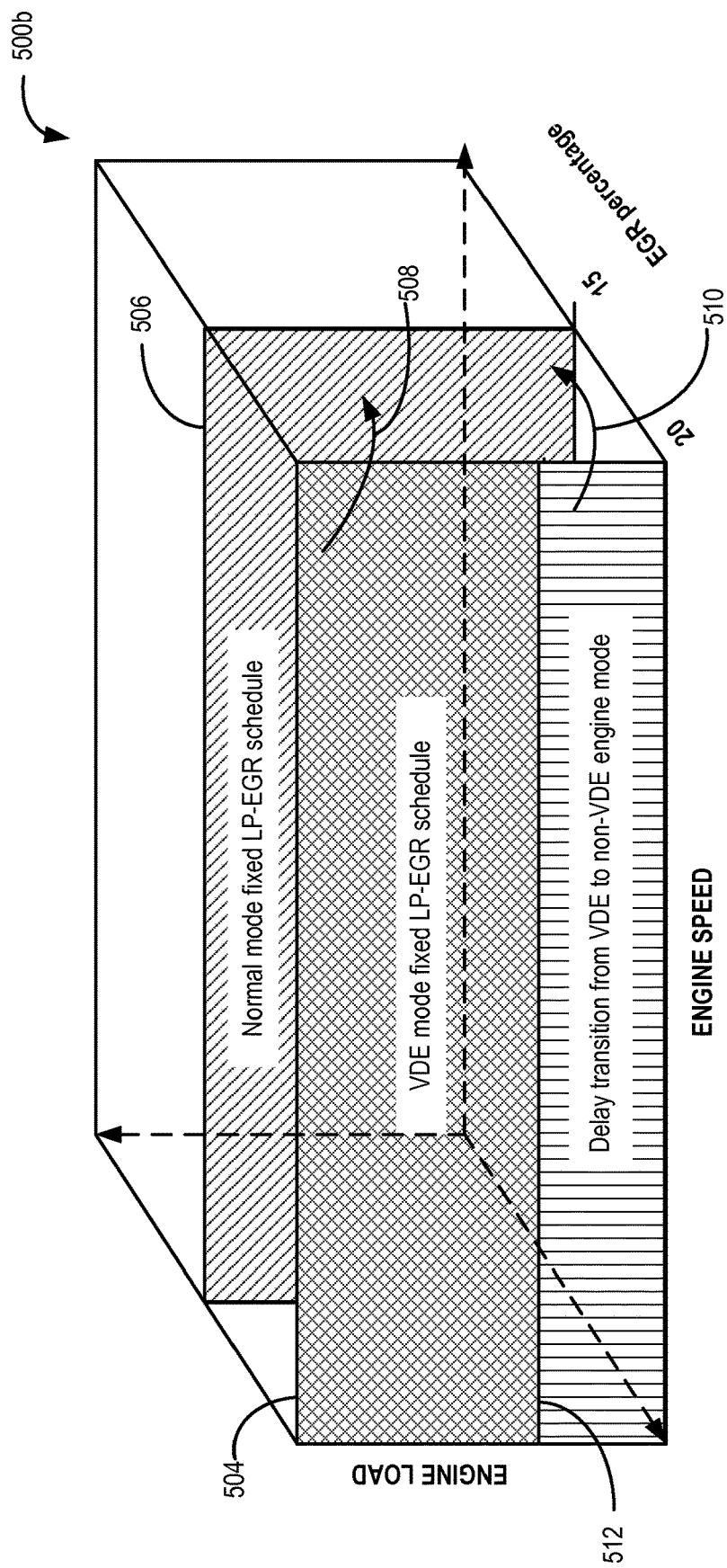
FIG. 5B shows an example speed-load map of distinct fixed EGR schedules including a first fixed LP-EGR schedule that is applied in the presence of cylinder deactivation and a second fixed LP-EGR schedule that is applied in the absence of cylinder deactivation.

Referring now to FIGS. 5A and 5B, example graphs illustrating maps for example LP-EGR schedule operating regions are shown. Specifically, FIG. 5A shows a 2-dimensional map 500a indicating operating regions for a fixed LP-EGR schedule and a variable LP-EGR schedule based on engine speed and load conditions. Map 500a shows engine load (which may be an air charge and/or airflow) on the Y-axis and engine speed on the X-axis. While this example illustrates speed and load as example parameters, various other parameters such as torque, transmission speed, engine coolant temperature, vehicle speed, etc., may be used.

In the given example, a fixed LP-EGR schedule operating region is depicted by a rectangular window 502. As discussed at FIG. 3, the fixed schedule range may include all engine loads from mid load down to minimum engine load, and/or engine speeds lower than a threshold, such as 3500 RPMs. A variable LP-EGR schedule operating region is depicted at engine speed and load conditions outside the fixed schedule range, and in some example may include all engine loads above mid-load (e.g., above 50% engine load) and all engine speeds above a threshold, such as 3500 RPMs.

During engine operating conditions in the fixed schedule range, LP-EGR may be provided at the fixed LP-EGR schedule, wherein LP-EGR percentage of intake air flow remains constant over the fixed speed and load range. Further, providing the fixed LP-EGR schedule may include providing a higher fixed EGR flow percentage or a lower fixed flow percentage based on an engine mode of operation (e.g., VDE or non-VDE). Details of operating regions within the fixed LP-EGR mode will be further elaborated with respect to FIG. 5B.

During engine operating conditions in the variable schedule range, LP-EGR may be provided at the variable EGR schedule, wherein the LP-EGR percentage of intake air flow is varied based on engine speed and load changes.

Further, based on speed and load of engine operation, LP-EGR schedule may be transitioned from the fixed mode range to the variable mode range, and vice-versa. As an example, during a tip-in to higher engine load conditions, engine operation may vary from the fixed schedule range to the variable schedule range (at a condition of higher speed and load compared to the fixed mode). As a result of increased engine speed and load from the fixed range to the variable range, the EGR schedule may be transitioned from the fixed mode EGR schedule (providing fixed EGR percentage with respect to intake air flow) to the variable mode EGR rate (providing variable EGR percentage with respect to intake air flow based on engine speed and load).

In this manner, an engine such as engine 10 at FIGS. 1 and 2 may be configured to operate at different EGR schedules based on engine operating conditions. As the operating conditions of the engine vary with engine operation, the engine may be controlled by the control system (e.g. controller 12 at FIGS. 1 and 2) to transition between various EGR schedules. Further, these transitions may be performed by adjusting one or more operating conditions such as EGR valve opening, spark timing, and/or throttle opening.

Now turning to FIG. 5B, it shows a 3-dimensional map 500b for the fixed mode LP-EGR schedule including a normal mode fixed LP-EGR schedule and a VDE mode fixed LP-EGR schedule. Map 500b shows engine load on the Y-axis, engine speed on the X-axis and LP-EGR percentage on the Z-axis. While this example illustrates speed and load as example parameters for X-axis and Y-axis respectively, various other parameters such as torque, transmission speed, engine coolant temperature, vehicle speed, etc., may be used while maintaining LP-EGR as the parameter for Z-axis.

During engine operation in the fixed mode operating range, LP-EGR may be provided at the normal fixed EGR schedule or the VDE fixed EGR schedule based on an engine operating mode. For example, when the engine is operating in a VDE mode with one or more cylinders deactivated, LP-EGR may be provided at the VDE mode fixed schedule. The VDE mode fixed schedule EGR rate is based on a minimum cylinder load during VDE mode. In the given example, the operating region for the higher fixed mode VDE is depicted by rectangular box 504, and EGR percentage at the VDE fixed mode is 20% of air flow in the intake manifold. Further, when the engine is operating in a normal mode (that is, non-VDE mode) with all the cylinders active and combusting, LP-EGR may be provided at the normal mode fixed schedule. The normal mode fixed schedule EGR rate is based on a minimum cylinder load during normal mode. In the given example, the operating region for the normal fixed mode is depicted by rectangular box 506, and the EGR percentage at the normal fixed mode is 15% of air flow in the intake manifold. As such the minimum cylinder load during the VDE mode is greater than the minimum cylinder load during the normal load. Consequently, EGR percentage during the VDE mode is greater than the EGR percentage during the normal (non-VDE) mode.

It will be appreciated that while in the examples discussed herein, minimum cylinder load is utilized, in alternate examples, air load per engine combustion may be utilized. For example, the VDE mode fixed schedule EGR rate may be based on a minimum air load during VDE mode, and the normal mode fixed schedule EGR rate is based on a minimum air load during normal mode.

Further, when the engine operation demands transition from the VDE mode of engine operation to the normal (non-VDE) mode of engine operation, based on the engine load at the time of engine operation transition request, the engine operation and the EGR scheduling may be transitioned simultaneously or the engine operation may transition after the EGR scheduling is transitioned. For example, when operating the engine in the VDE mode below a threshold engine load 512, in response to an engine operation transition request from the VDE mode to the non-VDE mode such as during a tip-out (in order to reduce NVH concerns), the engine operation transition out of the VDE mode may be delayed until the EGR is purged from the VDE mode fixed LP-EGR schedule to the normal mode fixed LP-EGR schedule. That is, during engine operation in the speed load region below threshold load 512, EGR may be first allowed to decrease from 20% to 15%. Upon the EGR percentage reaching 15%, the transition of engine operation out of the VDE mode may commence.

However, when operating the engine in the VDE mode above the threshold engine load, in response to the tip-out condition, engine operation may transition out of the VDE mode while transitioning the EGR schedule from the VDE mode fixed LP-EGR schedule to the normal mode fixed LP-EGR schedule.

In this way, by delaying transition of engine operation from the VDE mode to the non-VDE mode, in response to a tip-out confirmation below a threshold engine load, EGR may be purged to lower levels prior to engine transition. Consequently, excess dilution during transient conditions such as tip-out, may be reduced, and the engine cylinder may not be operated with a higher EGR level than it can tolerate. As a result, engine misfires due to excess engine dilution may be reduced.

Figure 6:
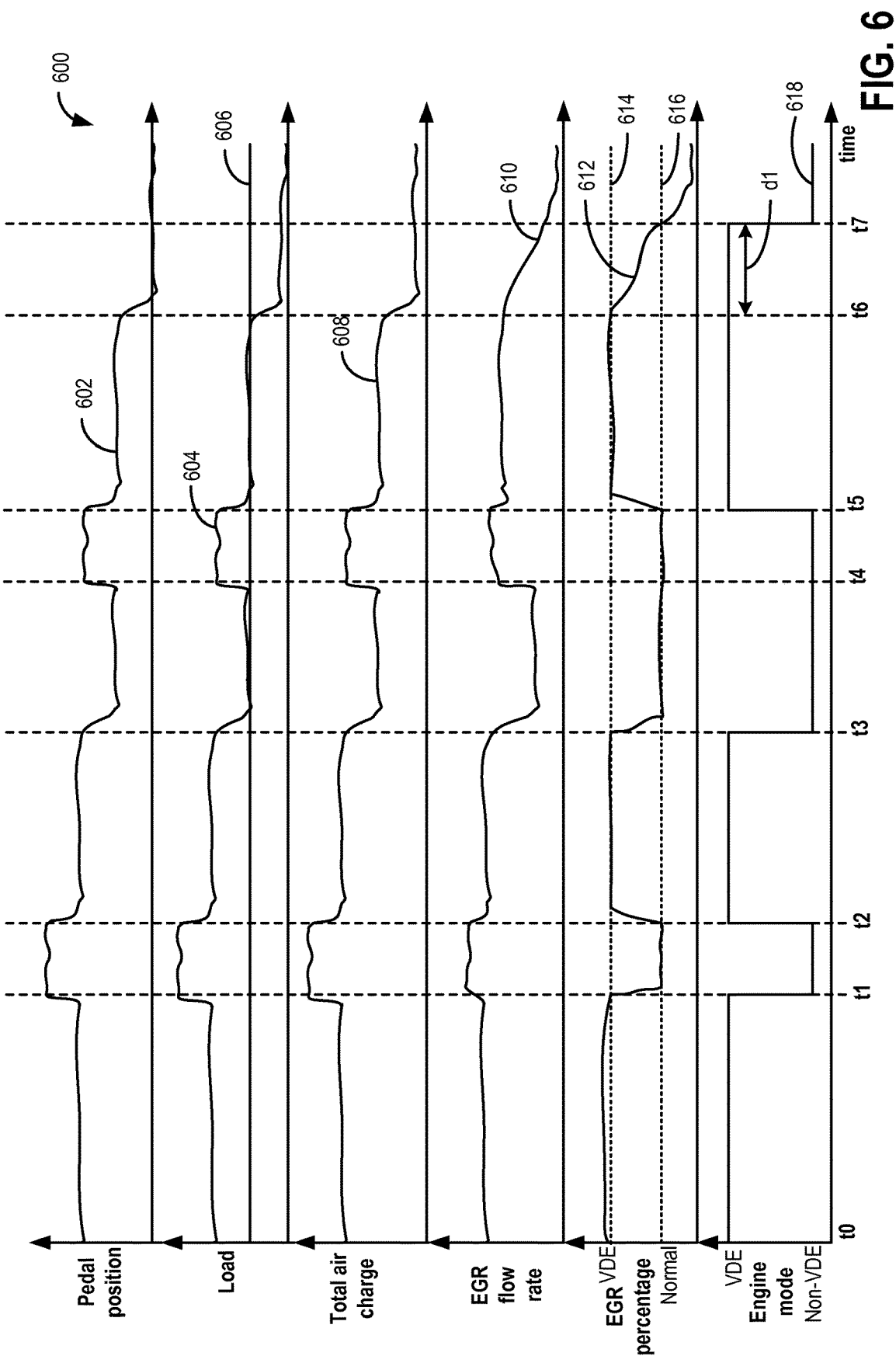
FIG. 6 shows an example adjusting of fixed LP-EGR schedules during transition between engine operation in VDE and non-VDE modes, according to embodiments of the present disclosure.

Turning to FIG. 6, it shows operating sequence 600 depicting an example fixed LP-EGR scheduling for a VDE engine based on a mode of engine operation. FIG. 6 illustrates example pedal position at plot 602, engine load at plot 604, total air charge at plot 606, LP-EGR flow rate at plot 610, LP-EGR percentage at plot 612, and engine mode at plot 618. The sequence of events in FIG. 6 may be provided by executing instructions in the system of FIGS. 1-2 according to the method of FIG. 4. Vertical markers at times t0-t7 represent times of interest during the sequence. In all the plots discussed below, the X axis represents time and time increases from the left side of each plot to the right side of each plot.

The first plot from the top of FIG. 6 represents accelerator pedal position versus time. The Y axis represents accelerator pedal position and a depression of the accelerator pedal increases in the direction of the Y axis arrow.

The second plot from the top of FIG. 6 represents engine load versus time. The Y axis represents engine load and the load increases in the direction of Y axis arrow. Horizontal line 606 represents a threshold engine load. The threshold engine load may be based on the EGR purge time at that engine air flow rate. The threshold engine load may be calibrated or modeled to ensure that the EGR rate in the intake manifold may be adjusted from the higher schedule to the lower schedule before the cylinder load can decrease to a cylinder load that will experience slow burns or misfires at the higher EGR schedule.

In one example, the threshold engine load may be based on a minimum load for EGR tolerance resulting in acceptable combustion stability.

The third plot from the top of FIG. 6 represents total air charge versus time. The Y axis represents total air charge and the total air charge increases in the direction of the Y axis arrow. Total air charge includes all air flowing through the LP-EGR system and includes both fresh airflow from the intake and EGR.

The fourth plot from the top of FIG. 6 represents LP-EGR flow rate versus time. The Y axis represents LP-EGR flow rate and the LP-EGR flow rate increases in the direction of the Y axis arrow. The LP-EGR flow rate may be the rate of LP-EGR mass flowing through the system.

The fifth plot from the top of FIG. 6 represents LP-EGR percentage versus time. The Y axis represents LP-EGR percentage, and the LP-EGR percentage increases in the direction of Y axis arrow. The LP-EGR percentage includes the relative amount of LP-EGR flow comprising the total airflow, that is, the percentage of LP-EGR within the total air charge. Horizontal line 614 represents the LP-EGR percentage during a VDE fixed mode schedule, and horizontal line 616 represents the LP-EGR percentage during a normal fixed mode schedule. In one example, the LP-EGR percentage when operating in the VDE mode fixed schedule may be 20% with respect to fresh intake air flow and the LP-EGR percentage when operating in the normal mode fixed schedule may be 15% with respect to intake air flow. As such, the LP-EGR percentage in the VDE mode fixed schedule may be greater than the LP-EGR percentage in the normal mode fixed schedule.

The sixth plot from the top of FIG. 6 represents engine mode versus time. The Y axis represents an engine mode of operation and the engine may operate in a VDE mode when one or more cylinders of the engine are deactivated or a non-VDE mode when all the cylinders are active and combusting.

At time t0, and between times t0 and t1, the engine may be operating in a low to mid-load range in steady state conditions with pedal position 602 maintained at a substantially constant position. Further, the engine may be operating in the VDE mode 608 with one or more cylinders deactivated, and therefore, LP-EGR may be provided at a higher VDE mode fixed schedule percentage (614).

At time t1, a vehicle operator may depress the accelerator pedal and initiate a "tip-in" event. As a result, a throttle (not shown) may open more, and the engine load, the total air flow 608, and the EGR flow rate 610 may increase. In response to the tip-in, the engine operation may transition from the VDE mode to the non-VDE mode and at the same time, the EGR schedule may also transition from VDE mode fixed schedule (e.g., 20% EGR) to normal mode fixed schedule (e.g., 15% EGR). Even though it may take a duration of time for the EGR percentage in the intake manifold to decrease from the VDE mode fixed schedule percentage to normal mode fixed schedule percentage, due to higher cylinder load conditions during the tip-in, the engine may tolerate higher EGR amounts. Hence, delaying transition of engine operation from the VDE mode to the non-VDE mode may not be required and the cylinders may be reactivated while EGR is ramped down.

In some examples, in response to the tip-in triggering transition out of the VDE mode, if an expected engine load in the non-VDE mode is less than or equal to a minimum VDE engine load threshold, engine transition from the VDE mode to the non-VDE mode may be delayed until the expected load exceeds the minimum VDE load threshold. As such, the minimum VDE load threshold may be based on a minimum engine load when operating the engine in the VDE mode.

Next, at time t2, the vehicle operator may release the accelerator pedal and initiate a "tip-out" event. As a result, the engine load and the total air charge may decrease to the initial amounts (that is, prior to t1). Further, in response to decrease in engine load, engine operation may transition from the non-VDE mode to VDE mode, and the EGR schedule may transition from the normal mode fixed schedule to the VDE mode fixed schedule. That is, the EGR percentage of intake air flow may increase to the higher VDE mode fixed percentage. When the engine load decreases during the tip-out, the EGR flow rate and the total air charge may also decrease.

At time t3, a second tip-out event may occur and the engine load may decrease. Further, the tip-out may occur when the engine load is greater than the threshold engine load. In response to the tip-out occurring when the engine load is greater than the threshold, the EGR schedule may transition from the VDE mode to the normal mode while transitioning the engine out of the VDE mode. As a result, EGR percentage may decrease to the lower normal mode fixed percentage (616), and the EGR flow rate may also decrease as the engine load and the total air charge decreases. Transitioning the engine out of the VDE mode in response to the tip-out may reduce NVH issues. Between t3 and t4, upon completion of the tip-out, the engine may be operating in the non-VDE mode with the LP-EGR provided at the normal mode schedule.

Next, at t4, a second tip-in event may be initiated. In response to the tip-in, the engine load and the total air charge may increase, and the engine may continue to operate in the non-VDE mode. Therefore, the EGR may continue to be provided at the lower normal fixed mode schedule.

At t5, a third tip-out event may occur resulting in engine operation transition from the non-VDE mode to the VDE mode, and EGR schedule transition from the normal mode fixed schedule to the VDE mode fixed schedule. Between t5 and t6, the engine may continue to operate in the VDE mode and the EGR may continue to be provided at the VDE mode fixed schedule.

At t6, a third tip-out event may occur, and as a result, the engine load may decrease. Further, the tip-out event may be initiated when the engine load is below the threshold engine load. In response to the tip-out occurring while operating in a VDE mode, it may be desirable to transition the engine out of the VDE mode in order to reduce NVH issues, and consequently, it may be desirable to transition the LP-EGR schedule from the higher VDE mode fixed percentage schedule to the lower normal mode fixed percentage schedule. However, due to large induction volume of the intake system, there may be delay in purging LP-EGR to the lower normal mode percentage. As a result, the engine operation may transition from the VDE mode to the non-VDE mode before the LP-EGR decreases to normal mode percentage. As such, when operating in the non-VDE mode, EGR tolerance for the engine is lower, and if the engine transitions to the non-VDE prior to the EGR levels reaching the normal mode level, excess dilution of intake air can occur leading to engine misfires. Therefore, when the engine is in a VDE mode, in response to the tip-out occurring at the engine load below the threshold, engine transition to the non-VDE mode may be delayed for a duration d1 (between t6 and t7) until the LP-EGR is purged from the VDE mode fixed percentage to the normal mode fixed percentage. That is, when operating the engine in a VDE mode, in response to the tip-out occurring at the engine load below the threshold engine load, the engine may be transitioned out of the VDE mode only when the LP-EGR decreases to the normal mode levels. Therefore, at t6, in response to the tip-out, engine transition out of VDE mode may be delayed until t7 when the EGR percentage decreases to normal mode fixed percentage of intake air flow.

As such, delivering a desired EGR percentage rate of fresh air (VDE mode schedule percentage or normal mode schedule percentage) includes coordinating adjustment of the LP-EGR valve and the throttle using feed-forward control, and includes feedback adjustment to maintain the percentage based on the EGR rate measurement from, e.g., an intake oxygen sensor. This includes changing both the intake airflow rate and the EGR flow rate in a coordinated way such that the EGR percentage is maintained as desired. As errors in the control may be present, maintaining the desired EGR percentage may include some small variation in the EGR percentage, e.g., 1-2% variation. During the fixed mode, when airflow increases, such as during the tip-in event at t1, the LP-EGR valve is adjusted to provide a corresponding increase in EGR flow to maintain the fixed EGR percentage.

In this way, EGR may be delivered according to a flat schedule to reduce EGR errors and improve the range of EGR delivery. The flat schedule may be further adjusted based on the operating mode of an engine with selectively deactivatable cylinders to account for the higher minimum cylinder loads applied when selected cylinders are deactivated and the lower minimum cylinder loads applied when all cylinders are active. By applying the schedules based on operating conditions, at each mode, the engine may be operated with an EGR schedule that the engine can tolerate. As such, this improves EGR delivery and EGR tolerance, while reducing the occurrence of misfire events.

It will be appreciated that while in some examples discussed herein, in response to tip-out occurring while operating the engine in the VDE mode, the engine operation may be transitioned out of the VDE mode (in order to reduce NVH issues, for example), in alternate examples, in response to tip-out conditions, the engine may continue to operate in the VDE mode. While in the VDE mode, EGR may be provided at a higher fixed percentage with respect to intake air flow.

In one example, the sequence of FIG. 6 illustrates a method for an engine, comprising: during a first tip-out, when operating in a VDE mode and above a threshold load, reactivating engine cylinders while transitioning from a higher EGR schedule to a lower EGR schedule; and during a second tip-out, when operating in the VDE mode and below the threshold load, reactivating engine cylinders after transitioning from the higher EGR schedule to the lower EGR schedule. Further, the method includes wherein the higher EGR schedule is based on a first EGR tolerance limit during engine operation in the VDE mode, and wherein the lower EGR schedule is based on a second EGR tolerance limit during engine operation a non-VDE mode, the first EGR tolerance limit greater than the second EGR tolerance limit. The method further includes wherein engine operation in the VDE mode includes operating with a total number of deactivated engine cylinders while delivering a higher fixed LP-EGR relative to intake airflow at the higher EGR schedule, and wherein engine operation in the non-VDE mode includes operating with all engine cylinders active while delivering a lower fixed LP-EGR relative to intake airflow at the lower EGR schedule. Still further, in some examples the method includes retarding a spark timing when all the cylinders are reactivated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   in response to a first tip-out occurring while operating the engine below a threshold engine load with one or more cylinders deactivated and with external low pressure exhaust gas recirculation (LP-EGR) provided at a higher fixed rate relative to fresh intake air flow,
   delaying reactivation of the one or more deactivated cylinders until the external LP-EGR has reduced from the higher fixed rate to a lower fixed rate relative to fresh intake air flow,
   wherein the higher fixed rate is based on a first minimum cylinder load of the engine with one or more engine cylinders deactivated and the lower fixed rate is based on a second minimum cylinder load of the engine when all engine cylinders are active.

2. The method of claim 1, further comprising, in response to a second tip-out occurring while operating the engine above the threshold engine load with one or more cylinders deactivated and with the external LP-EGR provided at the higher fixed rate, reactivating the one or more deactivated cylinders while reducing the external LP-EGR from the higher fixed rate to the lower fixed rate.

3. The method of claim 2, further comprising, in response to a tip-in occurring when operating the engine with one or more cylinders deactivated and with the external LP-EGR provided at the higher fixed rate, delaying reactivation of the one or more deactivated cylinders until an expected cylinder load with all cylinders active is greater than the first minimum cylinder load.

4. The method of claim 1, wherein the first minimum cylinder load is greater than the second minimum cylinder load.

5. The method of claim 1, wherein the lower fixed rate includes providing the external LP-EGR at 15% of fresh intake air flow, and wherein the higher fixed rate includes providing the external LP-EGR at 20% of fresh intake air flow.

6. The method of claim 1, wherein reducing the external LP-EGR to the lower fixed rate includes decreasing an opening of an EGR valve.

7. The method of claim 1, wherein the external LP-EGR is provided via a LP-EGR passage.

8. A method for an engine, comprising:
during a first tip-out: operating in a variable displacement engine (VDE) mode and above a threshold load and reactivating engine cylinders while transitioning from a higher external low pressure exhaust gas recirculation (LP-EGR) rate to a lower external LP-EGR rate; and
during a second tip-out: operating in the VDE mode and below the threshold load and delaying reactivation of engine cylinders until after transitioning from the higher external LP-EGR rate to the lower external LP-EGR rate.

9. The method of claim 8, wherein the higher external LP-EGR rate is based on a first EGR tolerance limit during engine operation in the VDE mode, and wherein the lower external LP-EGR rate is based on a second EGR tolerance limit during engine operation in a non-variable displacement engine (non-VDE) mode, the first EGR tolerance limit greater than the second EGR tolerance limit.

10. The method of claim 9, wherein engine operation in the VDE mode includes operating with one or more engine cylinders deactivated while delivering the higher external LP-EGR rate, and wherein engine operation in the non-VDE mode includes operating with all engine cylinders active while delivering the lower external LP-EGR rate.

11. The method of claim 8, wherein the higher external LP-EGR rate is 20%±2% of fresh intake airflow, and wherein the lower external LP-EGR rate is 15%±2% of fresh intake airflow.

12. The method of claim 8, wherein the higher external LP-EGR rate is based on a minimum cylinder load of the engine when one or more engine cylinders are deactivated, and wherein the lower external LP-EGR rate is based on a minimum cylinder load of the engine when all engine cylinders are active.

13. The method of claim 12, wherein the minimum cylinder load of the engine when the one or more cylinders are deactivated is greater than the minimum cylinder load of the engine when all engine cylinders are active.

14. The method of claim 8, wherein the higher external LP-EGR rate is based on a minimum air load per engine combustion when one or more cylinders are deactivated, and wherein the lower external LP-EGR rate is based on a minimum air load per engine combustion when all engine cylinders are active.

15. The method of claim 8, wherein the lower external LP-EGR rate is an external LP-EGR rate used during engine operation in a non-VDE mode.

16. The method of claim 8, wherein the lower external LP-EGR rate and the higher external LP-EGR rate are fixed external LP-EGR rates.

* * * * *